(12) United States Patent
Hsu

(10) Patent No.: US 6,578,420 B1
(45) Date of Patent: Jun. 17, 2003

(54) MULTI-AXIS MICRO GYRO STRUCTURE

(75) Inventor: Ying Wen Hsu, Huntington Beach, CA (US)

(73) Assignee: Microsensors, Inc., Costa Mesa, CA (US)

(*) Notice: Subject to any disclaimer, the term of this patent is extended or adjusted under 35 U.S.C. 154(b) by 0 days.

(21) Appl. No.: 09/604,782

(22) Filed: Jun. 26, 2000

Related U.S. Application Data

(63) Continuation-in-part of application No. 09/301,847, filed on Apr. 29, 1999, now Pat. No. 6,089,089, which is a continuation of application No. 08/943,305, filed on Oct. 14, 1997, now abandoned, and a continuation-in-part of application No. 09/166,458, filed on Oct. 5, 1998, now Pat. No. 5,955,668, which is a continuation-in-part of application No. 08/870,812, filed on Jun. 6, 1997, now abandoned.

(51) Int. Cl.[7] ............................................. G01C 19/00
(52) U.S. Cl. ................................................. 73/504.16
(58) Field of Search .......................... 73/504.16, 504.15, 73/504.12, 504.02

(56) References Cited

U.S. PATENT DOCUMENTS

| | | | | |
|---|---|---|---|---|
| 5,313,835 A | * | 5/1994 | Dunn ............................ | 73/510 |
| 6,128,955 A | * | 10/2000 | Mimura ........................ | 73/510 |
| 6,257,059 B1 | * | 7/2001 | Weinburg et al. ........... | 73/504.16 |

* cited by examiner

*Primary Examiner*—Richard A. Moller
(74) *Attorney, Agent, or Firm*—Myers Dawes & Andras; Joseph C. Andras; Vic Y. Lin

(57) ABSTRACT

A three-axis micro-gyro structure having first and second micro-gyro devices that measure angular velocity around first and second rate axes extending in a plane of the micro-gyro structure and a third micro-gyro that measures angular velocity around a third rate axis perpendicular to the plane of the micro-gyro structure.

52 Claims, 8 Drawing Sheets

MULTI-AXIS MICRO GYRO STRUCTURE

This application is a continuation-in-part of U.S. application Ser. No. 09/301,847 filed on Apr. 29, 1999 (now U.S. Pat. No. 6,089,089, the issue fee having been paid on May 15, 2000), which application is a continuation of U.S. application Ser. No. 08/943,305 filed on Oct. 14, 1997 and now abandoned, and a continuation-in-part of U.S. application Ser. No. 09/166,458 filed on Oct. 5, 1998 and issued as U.S. Pat. No. 5,955,668 on Sep. 21, 1999, which application is a continuation-in-part of U.S. application Ser. No. 08/870,812 filed on Jun. 6, 1997 and now abandoned.

BACKGROUND OF THE INVENTION

This invention relates to sensing devices which utilize the gyroscopic principle, i.e., measuring the Coriolis force created by the conservation of momentum of a moving body. Specifically, the invention concerns devices called microgyros, which are small and inexpensive. They rely on conservation of momentum of a structure having limited oscillatory motion. They are able to withstand rough environments for long periods of time.

In this field, the terms used to describe the directions of motions and of forces can be confusing. Applicant in describing and claiming the present invention will refer to the three separate directions (Which are orthogonally related to one another) as follows: (a) the driven element, which is caused to oscillate (vibrate) at a predetermined, arbitrary rate inside the gyro moves in a linear drive direction; (b) the rotational velocity of the gyro environment in terms of angular rate, which is to be determined by the gyro, is around the rate axis; and (c) the Coriolis force, which is a function of the rotational velocity of the gyro environment, is measured by motion of a sensing element in an output direction.

Common assignee application Ser. No. 08/870,812 relates to a micro-gyro that "separates the mass (momentum of inertia) of the constant motion element driven to oscillate around the drive axis from the mass (momentum of inertia) of the variable motion sensing element which creates the measured force". It accomplishes that result by "using: (a) an outer ring-shaped element which oscillates around the drive axis, and (b) an inner disk-shaped element which oscillates, or rocks, around the output axis as a result of the Coriolis effect." Its dual-element structure "permits the ring and the disk to be excited independently, so that each can be dynamically compensated for manufacturing tolerances by counterbalancing."

Lutz Patent No. 5,604,312 shows a rate-of-rotation sensor that uses "an oscillatory mass" moving in a linear vibrating direction, and "a deflectable mass" caused by Coriolis force to move in a linear vibrating direction perpendicular to the motion of the oscillatory mass. Measurement of the Coriolis effect is used to determine angular velocity of the entire sensor around a rate axis, which is perpendicular to the linear vibrating directions of both masses.

The micro-gyro of the common assignee application is able to determine the external rate of rotation around either of the two (X and Y) axes which lie in the plane of the micro-gyro, but not around the third (Z) axis, which is perpendicular to the plane of the micro-gyro. The micro-gyro of the present application, like the sensor of the Lutz patent, is able to determine rate of rotation around the Z-axis, which is perpendicular to the plane of the micro-gyro.

SUMMARY OF THE INVENTION

The present invention, like Application S/N 08/870,912, separates the mass of the constant motion element" from the mass of the "variable motion sensing element". Like Lutz Pat-5,604,312, it has an essentially rectangular arrangement, and uses perpendicular linear forces of an "oscillatory mass", which creates the driving vibrations, and a "deflectable mass", whose vibrations are measured to quantify the angular velocity of the gyro around the rate. or Z. axis.

Differences of major significance between the micro-gyro of this invention and the sensor disclosed in the Lutz patent are that in the present invention the two masses lie in the same plane, and that these movements are independent of one another. In the Lutz patent, on the other hand, the deflectable mass is mounted on top of the oscillatory mass. The Lutz structure, because of its two-tier design, is significantly more difficult and costly to manufacture, and inherently less precise in its structure. Also, its piggy-back arrangement prevents independent movement of the two masses, because the deflectable mass is constrained to move with the deflectable mass on which it is mounted.

The present invention may have its first moving element formed with an open center, i.e., formed as a rectangular "ring" while the second moving element, formed as a rectangular "plate", may be located within the open center area of the first element. The outer element, having greater mass, is the oscillatory mass, and the inner clement is the deflectable mass, which is moved by the Coriolis force.

An important practical advantage of the present invention is its manufacturing process, in which the two masses may be simultaneously formed by deposition of material on the substrate, followed by photolithography steps to define the separate elements.

In the present invention, the two masses are connected to, and supported by, anchors formed on the substrate. The connecting members are flexures (or links) which are compliant, i.e., permit relatively free motion, in the desired direction, and which are very stiff, i.e., permit substantially zero motion, in other directions. The purpose is to have a maximum transmission of vibration (oscillation) energy solely in the appropriate direction.

A preferred arrangement has one or more anchors supporting both the inner sensing element and the outer driving element. Each anchor is connected by a flexure to the inner element to support the inner element, while permitting it to oscillate in a linear direction. Each anchor-connected flexure is connected by a flexure to the driving element, in order to support the outer element, and also to transmit Coriolis force to the inner element. The outer element is driven to oscillate in a direction which is co-planar with, but perpendicular to, the force on the inner element.

In a first aspect, the invention may be regarded as a unitary three-axis micro-gyro structure that comprises: a monolithic substrate, and three micro-gyro devices formed simultaneously as a layer on the substrate by successive steps of depositing material, delineating desired material shapes by lithography, and etching to remove unwanted material, the first micro-gyro device being so constructed as to measure angular velocity of the micro-gyro structure around a first rate axis extending in the plane of the micro-gyro, the second micro-gyro device being so constructed as to measure angular velocity of the micro gyro structure around a second rate axis extending in the plane of the micro-gyro and perpendicular to the first rate axis; and the third micro-gyro device being so constructed as to measure angular velocity of the micro-gyro structure around a third rate axis perpendicular to the plane of the micro-gyro.

In a second aspect, the invention may be regarded as a three-axis micro-gyro structure comprising: first and second micro-gyro devices that measure angular velocity around first and second rate axes extending in a plane of the micro-gyro structure; and a third micro-gyro device that measures angular velocity around a third rate axis perpendicular to the plane of the micro-gyro structure.

In a third aspect, the invention may be regarded as a three-axis micro-gyro structure comprising: first and second micro-gyro devices that are substantially identical in construction, the first and second micro-gyro devices being constructed as to measure angular velocity of the micro-gyro structure around first and second rate axes extending in a plane of the micro-gyro structure, the first and second micro-gyro devices being oriented relative to one another in a plane of the micro-gyro structure to position the second rate axis perpendicular to the first rate axis; and a third micro-gyro device being constructed as to measure angular velocity of the micro-gyro structure around a third rate axis perpendicular to the plane of the micro-gyro structure.

In a fourth aspect, the invention may be regarded as a three-axis micro-gyro structure comprising: a planar substrate; a first micro-gyro device supported by the planar substrate and constructed as to measure angular velocity around a first rate axis extending in the plane of the substrate, a second micro-gyro device supported by the planar substrate and constructed as to measure angular velocity around a second rate axis extending in the plane of the substrate and perpendicular to the first rate axis; and a third micro-gyro device supported by the planar substrate and constructed as to measure angular velocity of the micro-gyro structure around a third rate axis perpendicular to the plane of the substrate.

In a fifth aspect, the invention may be regarded as a method of measuring angular velocity about three orthogonal axes comprising the steps of: providing first, second and third micro-gyros on a planar substrate; orienting the first micro-gyro to measure angular velocity about a first axis parallel to the substrate; orienting the second micro-gyro to measure angular velocity about a second axis perpendicular to the first axis and parallel to the substrate; and orienting the third micro-gyro to measure angular velocity about a third axis perpendicular to the substrate.

DETAILED DESCRIPTION OF SPECIFIC EMBODIMENTS

Figure 1:
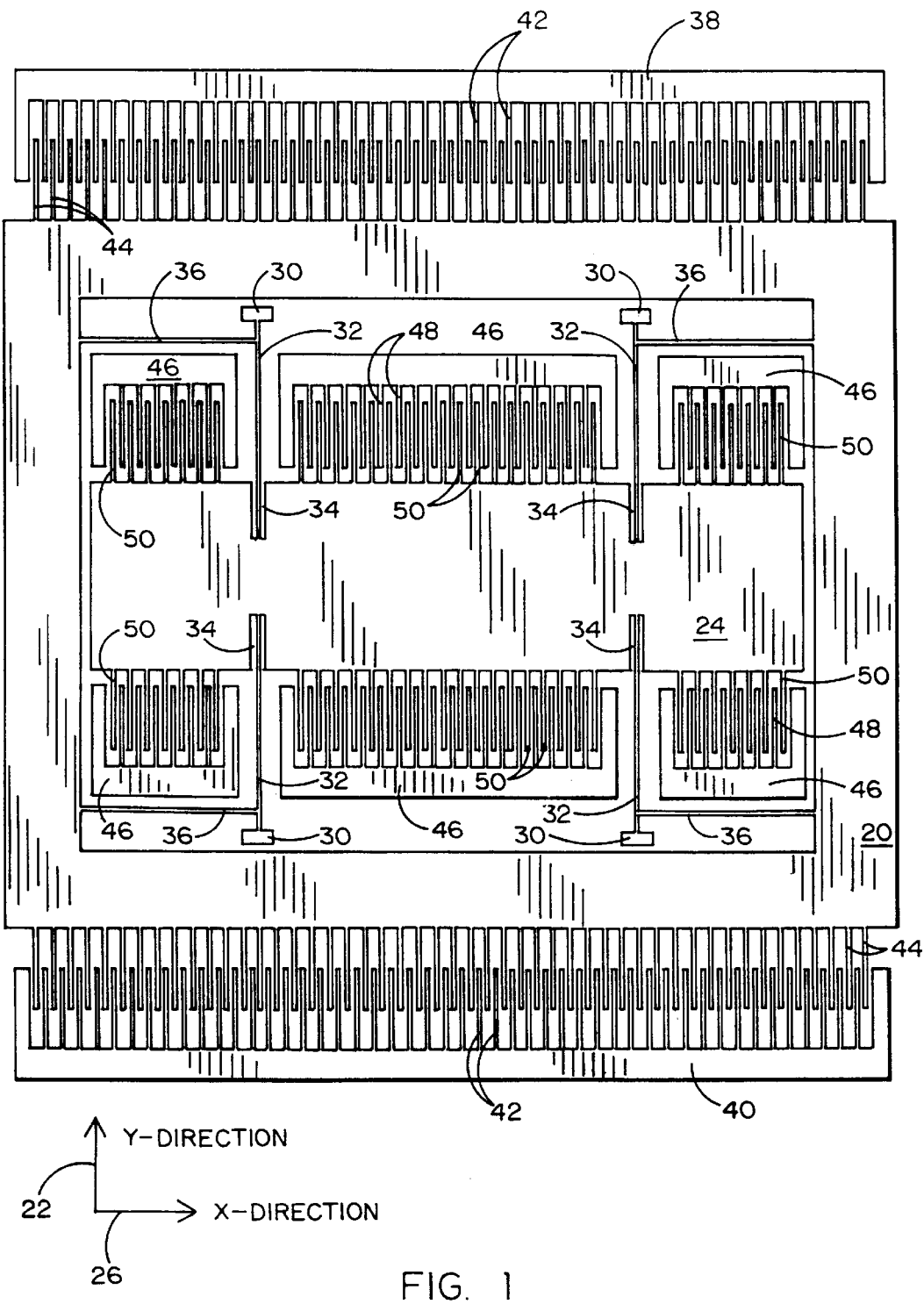
FIG. 1 is a simplified plan view showing the driving element and the sensing element of a micro-gyro.

FIG. 1 is a simplified plan view of the linearly movable parts lying in the operating plane of the micro-gyro. An outer element 20 functions as the driving mass of the gyro. It is caused to oscillate (vibrate) at a pre-determined rate on the line indicated by the arrow 22 marked "Y-Direction". An inner element 24 functions as the sensing mass of the micro-gyro. It is caused by Coriolis force to oscillate (vibrate) on the line indicated by the arrow 26 marked "X-Direction". Both elements 20 and 24 move in the plane of the drawing. Vibration of outer element 20 is continuous. Vibration of inner element 24 only occurs when Coriolis force is present, which is created when the entire micro-gyro is caused by external force to move or rotate around a rate axis perpendicular to the plane of the drawing. Such rotational movement causes Coriolis force, which is transmitted from outer element 20 to inner element 24. The Coriolis force is very small; so its correct measurement requires extreme precision and low noise. The Coriolis measurement is used to determine the speed of rotation (angular motion or angular rate) of the micro-gyro around the rate axis.

Figure 3:
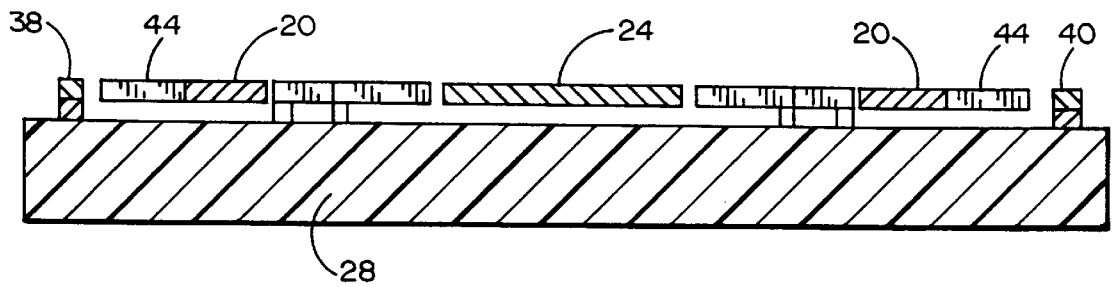
FIG. 3 is a cross-section taken on line 3—3 of FIG. 2.

The outer element 20 and inner element 24 of the gyro are supported on, and suspended above, a substrate 28, which is shown in FIG. 3. The substrate 28 may be formed of any suitable material, e.g-, silicon, quartz, nickel, other metals or metal alloys, ceramic. In the present design, silicon has been chosen.

The drawings show four anchors (posts) 30 mounted on the substrate 28, and connected to the inner and outer movable elements 20 and 24. Each anchor 30 is connected to the inner element 24 by a flexure (link) 32, which allows movement of element 24 in the X-direction but prevents its movement in the Y-direction. In order to accommodate the desired length of flexures 32 within a compact gyro structure, the inner element 2, has four notches 34, into each of which extends a flexure 32. The flexures 32 are very narrow (e.g., three microns) and quite long, in order not to restrict X-direction motion of element 24.

Four flexures 36 support outer element 20 and transmit Coriolis force from outer element 20 to inner element 24. Each flexure 36 is connected at its inner end to one of the flexures 32, near the connection of that flexure to its anchor 30. The flexures 36 are designed to allow vibration of outer element 20 in the Y-direction while preventing its motion in the X-direction. Each flexure 36 does transmit Coriolis force to the inner element 24, thereby tending to cause motion of element 24 in the X-direction. The location of the connection between each flexure 36 and its connected flexure 32 is such that the Coriolis force is transmitted without compromising the independence of motion of the inner and outer elements 24 and 20. Flexures 32 and 36 are formed of a resilient material which exerts a spring force tending to return the flexures toward their center location after flexing.

Various means are available to create driving force on the outer element, e.g. electrostatic, magnetic, piezoelectric, and so on. In the preferred version, electrostatic forces are used in the form of a comb drive. Two electrodes 38 and 40, supported on substrate 28, are located on opposite sides of outer element 20. Each of the electrodes 38 and 40 has a multiplicity of fingers (or comb teeth) 42 extending inwardly toward element 20, and element 20 has a multiplicity of fingers (or comb teeth) 44 extending outwardly toward the adjacent electrode, and located between adjacent fingers 42 on the electrode. This arrangement of alternating fingers 42 and 44 multiplies the effectiveness of the applied voltages in creating Y-direction vibration of outer element 20. An intermediate voltage is applied to the element 20, and alternating higher and lower voltages (180' out of phase) are applied to the electrodes 38 and 40, in order to vibrate element 20. For example, the voltage on element 20 may be held at 6 volts, while the electrode 33 alternates between 10 volts and 2 volts and electrode 40 alternates between 2 volts and 10 volts. Such voltages are supplied via terminals supported on the substrate, and connected both to the appropriate gyro-elements and to exterior voltage sources.

The purpose of the micro-gyro, i.e., measuring the angular velocity of the gyro package around rate axis Z, is accomplished by sensing the Coriolis force tending to move inner plate element 24 in the X-direction. Its motion, or tendency to move, can be sensed in various ways, e.g. changes in capacitance, or piezoelectric, magnetic or optical sensing. In the illustrated preferred embodiment, capacitance is the sensing medium.

FIG. 1, which is schematic but not precise, shows six electrodes 46, each having a multiplicity of inwardly extending fingers 48, which are arranged in alternating; relationship with a multiplicity of fingers 50 extending outwardly from inner plate element 24. The actual arrangement is shown in FIG. 2, and is best understood from FIG. 4 which is a close-up of a small portion of the capacitance-sensing structure which detects the Coriolis force acting on inner plate element 24.

Figure 2:
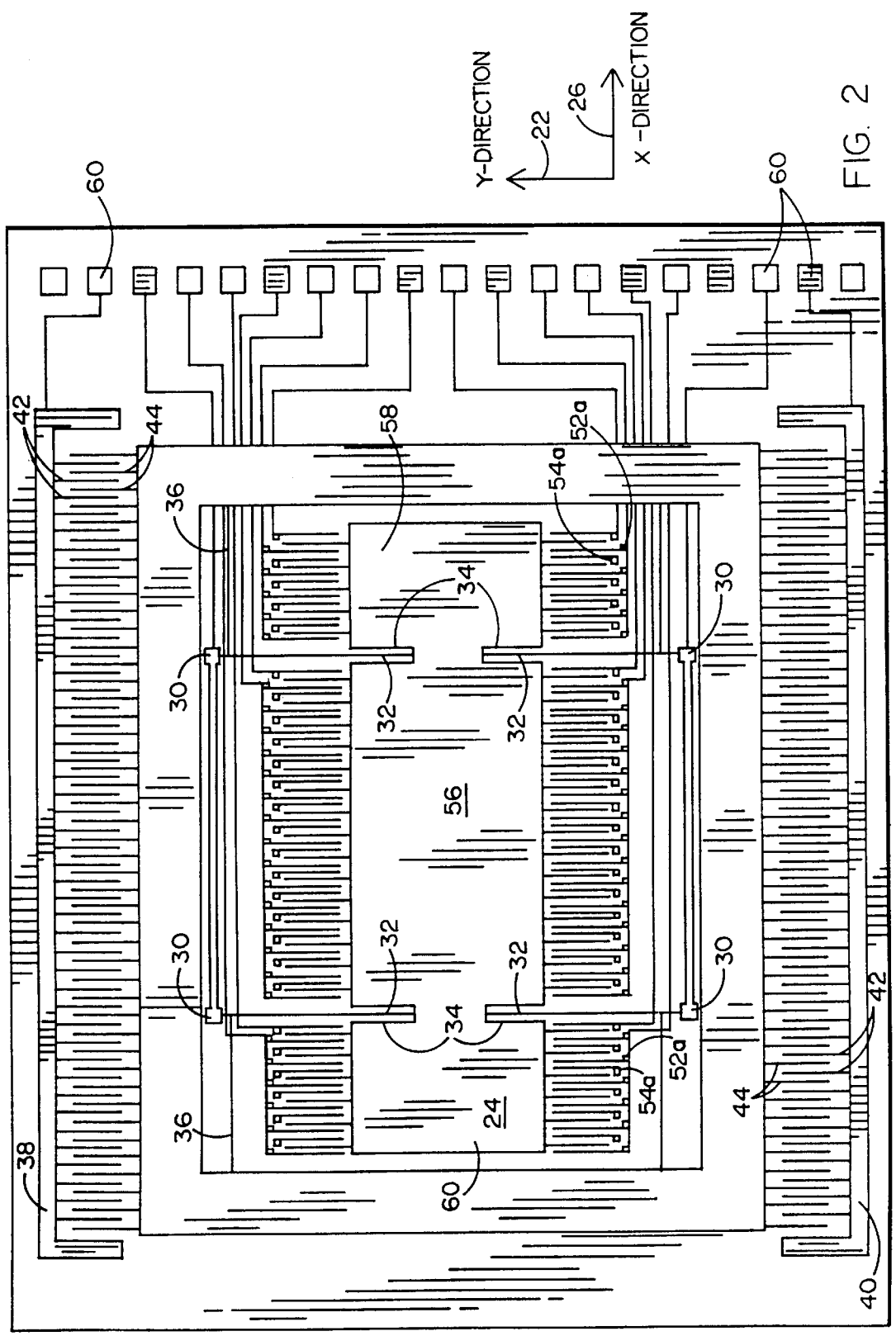
FIG. 2 is a more detailed plan view of the same micro-gyro.
Figure 4:
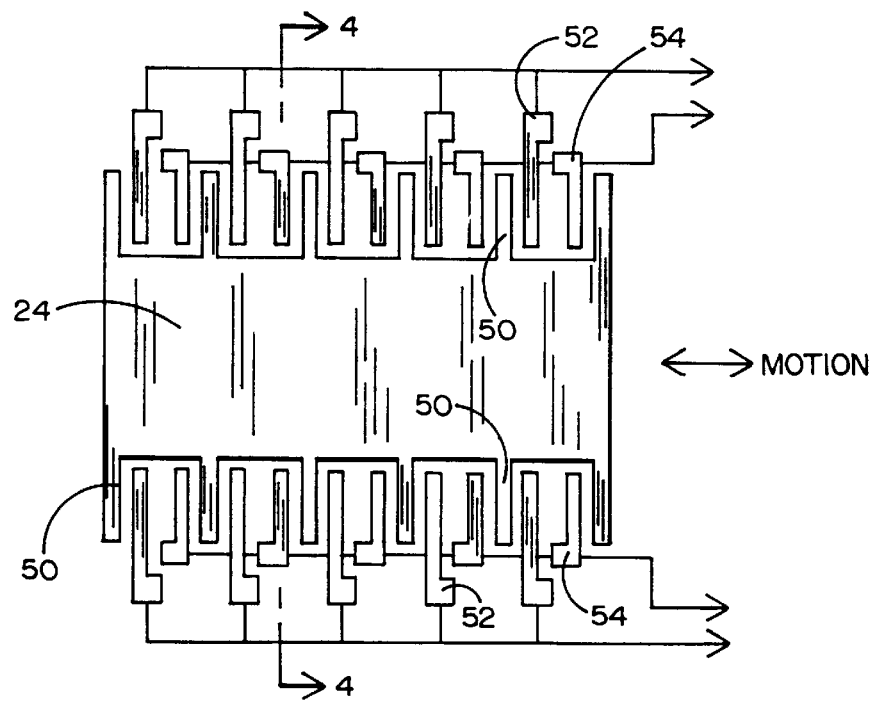
FIG. 4 is a close-up, showing a small portion of the Coriolis sensing structure.
Figure 5:
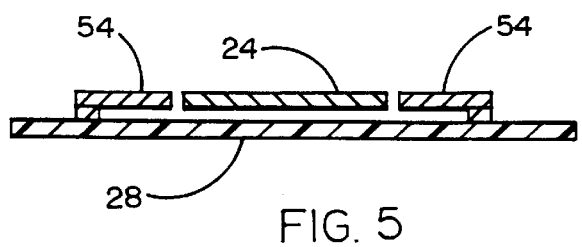
FIG. 5 is a cross-section taken on line 5—5 of FIG. 4.

As seen in FIGS. 2 and 4, a multiplicity of electrodes 52 and 54, arranged in pairs, are mounted on the substrate, and electrically connected to detection electronics. The electrodes 52 and 54 form pairs of parallel capacitors. The inner plate element 24 has outwardly extending fingers 50, with each pair 52/54 of electrodes located between adjacent fingers 50. When the distance between each finger 50 and the adjacent electrodes 52 and 54 changes, the value of capacitance changes. This capacitance change can be measured by using suitable electrical circuits. The sensing electrodes 52 and 54 in each pair operate in the opposite sense, i.e., when one capacitor increases, the other decreases. This sensing of capacitance provides differential sensing, which results in improved sensitivity. In the differential mode as opposed to the absolute mode, the effects of environmental and electrical noise are drastically reduced, i.e., canceled out. All effects that affect both capacitors in each pair are eliminated from the sensing circuit.

The length of inner element 24 (left to right in the figure) is shown extended to provide three sections. The center section 56 is the "sensing" section. The other two sections 58 and 60 are the "rebalancing" and the "correction" sections. They are optional, but have significant benefits. The rebalancing section 58 is shown at the right end of plate element 24 in the figure; and the correction section 60 is shown at the left end of plate element 24. The electrodes in the rebalancing section are designated 52*a* and 54*a*; the electrodes in the correction section are designated 52*b* and 54*b*.

The primary purpose of the rebalancing section is to permit operating the gyro in a closed-loop mode, which greatly increases the maximum rate detectable, and significantly reduces the detection time required. In an open-loop mode, plate 24 is free to move whenever a Coriolis force is generated. The amplitude of the plate's movement is the measure of the rate. In a closed-loop mode, plate 24 is actively maintained in a known position (null), through the use of feedback and of a mechanism for forcing the plate 24 into the null position. In closed-loop mode, the electrical voltage (or current) necessary to counteract the Coriolis force becomes the measure of rate. In operation, an electrical potential is applied to the rebalancing electrodes 52*a* and 54*a*, and to the plate 24. The voltage necessary to maintain the plate 24 in the null position is controlled, based on the feedback from the main sensing electrodes 52 and 54.

The combination of the sensing electrodes 52 and 54 and the rebalancing electrodes 52*a* and 54*a* also provides a means for self-testing of the micro-gyro. To do so, the rebalancing electrodes 52*a* and 54*a* are intentionally injected with a voltage that moves the plate 24. The resulting movement can be verified with the sensing electrodes 52 and 54. The measured change, for example in capacitance value, can be compared to memory-stored data re the acceptable values obtained during calibration. In this manner, the sensor can be tested at the Start of every application. The self-testing capability is particularly crucial for applications where high reliability and safety are involved.

The primary purpose of the correction section, with its electrodes 52*b* and 54*b*, is to correct for any cross-axis coupling problems due to any manufacturing imprecision. For example, the outer ring element 20, due to manufacturing and electronic errors, may not oscillate in a direction exactly orthogonal to the motion of plate 24. The small lateral forces generated by this manufacturing imprecision will be transferred to the plate 24, and will be detected, erroneously, as a Coriolis force. This cross-coupling error signal can be significantly larger than the Coriolis force, and can be removed by synchronous demodulation or other signal processing techniques known to those skilled in the art. In this preferred embodiment, the solution is to actively suppress the error signal by driving the plate 24 electrostatically with a force that is equal, but opposite in direction, to the error signal. The correction electrodes 52*b* and 54*b* provide a force to offset the force due to imbalance from the drive element.

Another application of the correction electrodes 52*b* and 54*b* is for frequency matching. By providing a small force opposing the movement of plate 24, the resonant frequency of the plate can be adjusted.

The vibration (oscillation) of outer element 20 should be at its resonant frequency and the inner and outer elements 20 and 24 should be so designed that, when inner element 24 is vibrating due to Coriolis force: (a) it will also be vibrating at its resonant frequency, and (b) the inner and outer elements will be vibrating at the same frequency. Operating at or near resonant frequency, and matching the frequencies of the inner element 24 and outer element 20, causes amplification of the small Coriolis signal, and permits its effective measurement.

Figure 6:
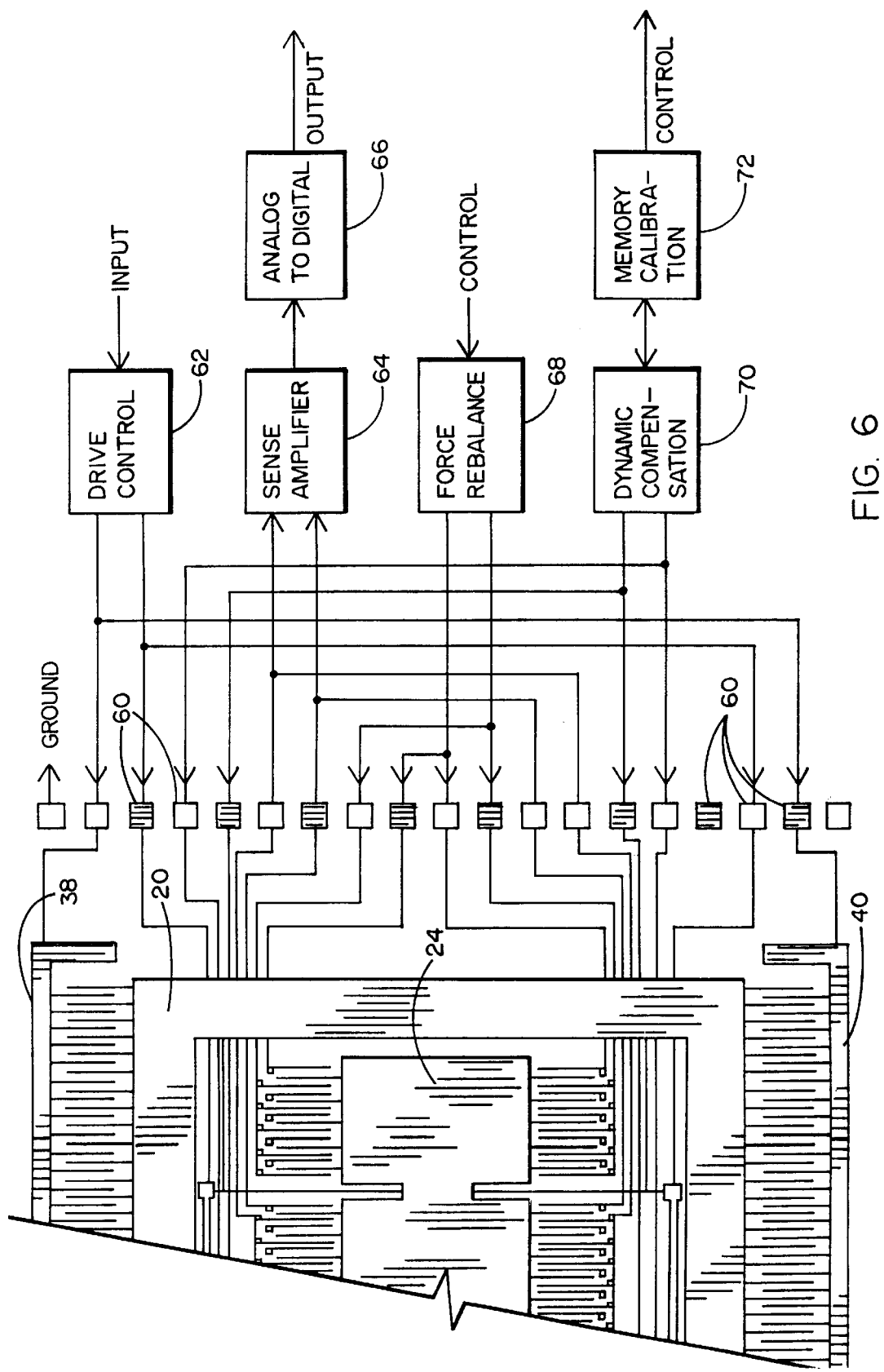
FIG. 6 shows a block diagram of the external circuitry and its connections to terminals an the micro-gyro substrate.
Figure 7:
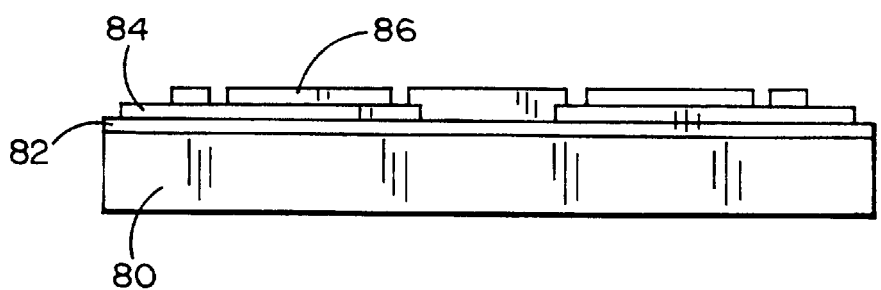
FIG. 7–10 show the micro-gyro in four stages of the single-layer manufacturing process.
Figure 8:
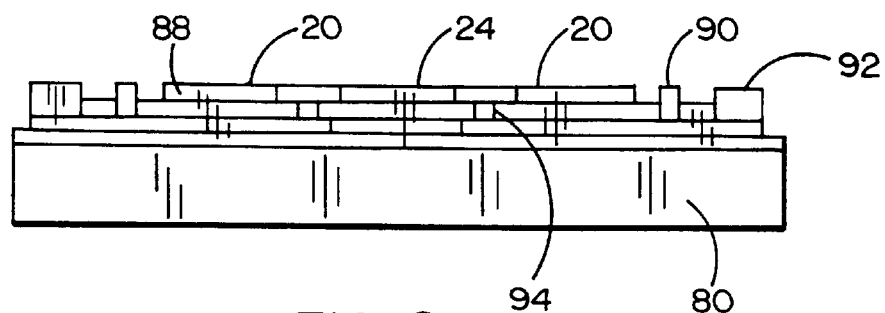
Figure 9:
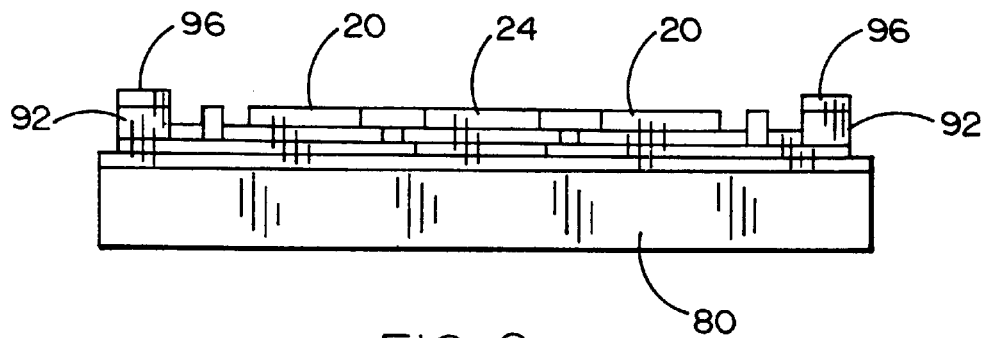
Figure 10:
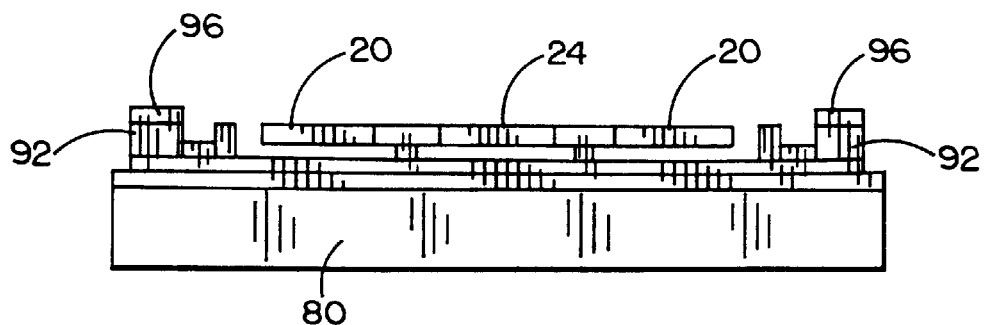

FIG. 2 is a detailed plan view which includes the electrical connecting lines, in addition to the mechanical elements of the micro-gyro. FIG. 6 shows a cut-off portion of FIG. 2, combined with a block diagram of the circuitry applicable to driving and sensing the micro-gyro elements. A series of terminals 60 are mounted on the substrate 24, with connecting lines extending to the gyro elements, and to the external electronic units. A drive block 62 contains the circuitry to drive the electrodes with different potentials. A sensing amplifier 64 receives signals from the sensing electrodes, and amplifies, filters, and buffers the signals. The resulting analog signals are then converted into digital format through an A/D converter block 66. A force rebalancing block 68 receives the position information regarding the plate and, depending on the control signal, provides a counterbalancing voltage to rebalance the plate into a null position. A dynamic compensation block 70 contains the circuitry to correct for unbalances due to manufacturing errors. The values of corrections are taken from a memory 72, stored during initial sensor calibration. In addition to manufacturing tolerances, other parameters, such as those due to temperature, acceleration sensitivity and pressure, can also be included. The design of these electronic circuits is known to those skilled in the art of micro systems engineering.

As stated in the Summary, the present invention is preferred over certain prior art micro-gyros because it permits manufacturing the gyro elements as a single layer formed by deposition of material on the substrate, followed by photolithography steps, e.g., masking, developing, and etching, to define and suspend the gyro movable elements. A major source of error that affects the performance of micro-gyros whose operation is based on linear momentum is generally referred to as "quadrature error". This error originates from the misalignment between the motions of the drive and response elements. To generate the momentum, the drive element is subjected to an oscillating force. This force is directed along the first linear direction (Y-direction); and the response due to Coriolis force is sensed along a second linear direction (X-direction), which is oriented orthogonally to the first linear direction. Due to manufacturing imperfections, a small fraction of the driving force will be coupled from the drive motion into the response motion, thus creating an error signal that will ultimately limit the performance of linear momentum gyros. The quadrature error is exacerbated by the fact that a typical oscillating force is about 100 thousand to 1 million times larger than the minimum Coriolis forces. This means that the alignment accuracy between drive and sense axes needs to be better than 1 part in 100,000 (or 1 million) to reduce the error signal equal to the anticipated rotational rate signal. This stringent manufacturing tolerance is virtually unachievable. Nonetheless, quadrature error can be reduced by techniques such as position feedback compensation, and synchronous demodulation, the best strategy is to reduce quadrature error by minimizing alignment error.

The single-layer design of the present invention requires only one patterning and etching process. In other words, the drive and sense elements are formed simultaneously in a single patterning and etching process. The single photolithography process drastically improves the alignment accuracy. In addition, by reducing the number of processing steps and the number of photolithography masks required, this gyro can be produced at significantly lower cost. Furthermore, with single layer processing, this gyro can cope with relatively greater manufacturing tolerances. The single-layer manufacturing process is feasible because of (a) the opening in the center of the driving element 20 to accommodate the sensing element 24; (b) the intersecting construction of the flexures 36 and 32; and (c) the location of mounting anchors 30 inside the driving element 20.

FIGS. 7–10 show the micro-gyro construction in four stages of the single-layer manufacturing process. A suitable substrate material is silicon, which can be used in wafer form to manufacture a multiplicity of micro-gyro devices in a single process. The process begins with doping silicon wafers 80 with phosphorous to reduce charge feedthrough to the substrate from the electrostatic devices on the surface. Next, a layer 82 of 500 nm thick silicon nitrite is deposited on the wafer surface to provide electrical isolation. Next, a 500 nm polysilicon film 84 is deposited on top of the silicon nitrite. The polysilicon film 84 is patterned using photolithography, and then etched to produce the electrodes and electrical traces for interconnection. A sacrificial layer 86 is deposited using 2000 nm of phosphosilicate glass. The sacrificial layer is later removed at the end of the process to provide a free space to allow vertical motion of the micro-gyro. The sacrificial layer 86 is patterned to provide access for connection between the polysilicon film 84 and the next structural layer.

A layer 88 of polysilicon 2000 nm thick is deposited over the sacrificial layer 86. The layer 83 will serve as the structural layer that forms the moving parts of the micro gyro. In the same photolithography, all major structures are formed. These structures include the drive element 20, the sense element 24, the electrostatic comb drives 90, the wire bond pads 60, and any spacers 92 used to support the entire structure. The final deposition is a 500 nm metal layer 94 (typically gold or aluminum) used for electrical contact. Photolithography will limit the metal so that it remains only on the wire bond pads 60. The last process step involves dissolving the sacrificial layer 86 in multiple solutions of acid and deionized water. The structure is then rinsed in alcohol and dried in an oven. After drying, the wafer is diced into individual devices.

Figure 11:
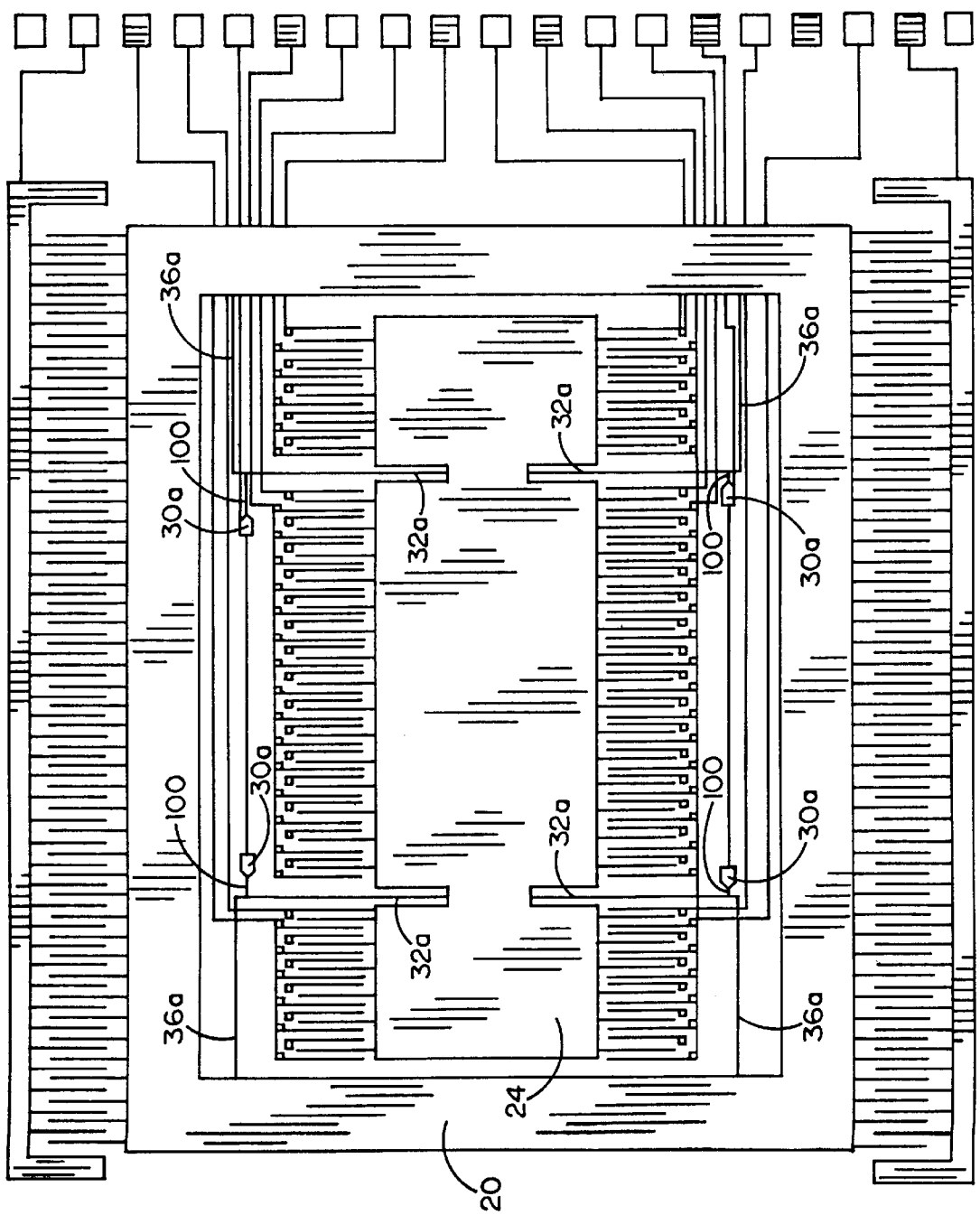
FIG. 11 is a plan view of a different embodiment of the micro-gyro.

FIG. 11 is a plan view of a different embodiment of the micro-gyro. It's differences are in the structures of the four anchors (designated 30a) and of the interconnected flexures (designated 32a and 36a). The structure of FIG. 11 permits a more compact micro-gyro design, because the interconnection of each outer-element-supporting flexure 36a with its corresponding inner-element-supporting flexure 32a is located at the end of flexure 32a, which lies beyond its supporting point at anchor 30a. The connection of flexures 36a and 32a is L-shaped, instead of T-shaped, as shown in FIGS. 1 and 2. In order to accommodate this interconnection of flexures 36a and 32a and the transmission of Coriolis force from 36a to 32a, each anchor 30a has a very small tip 100 which provides a slightly flexible hinge between flexure 32a and its anchor 30a.

Figure 12:
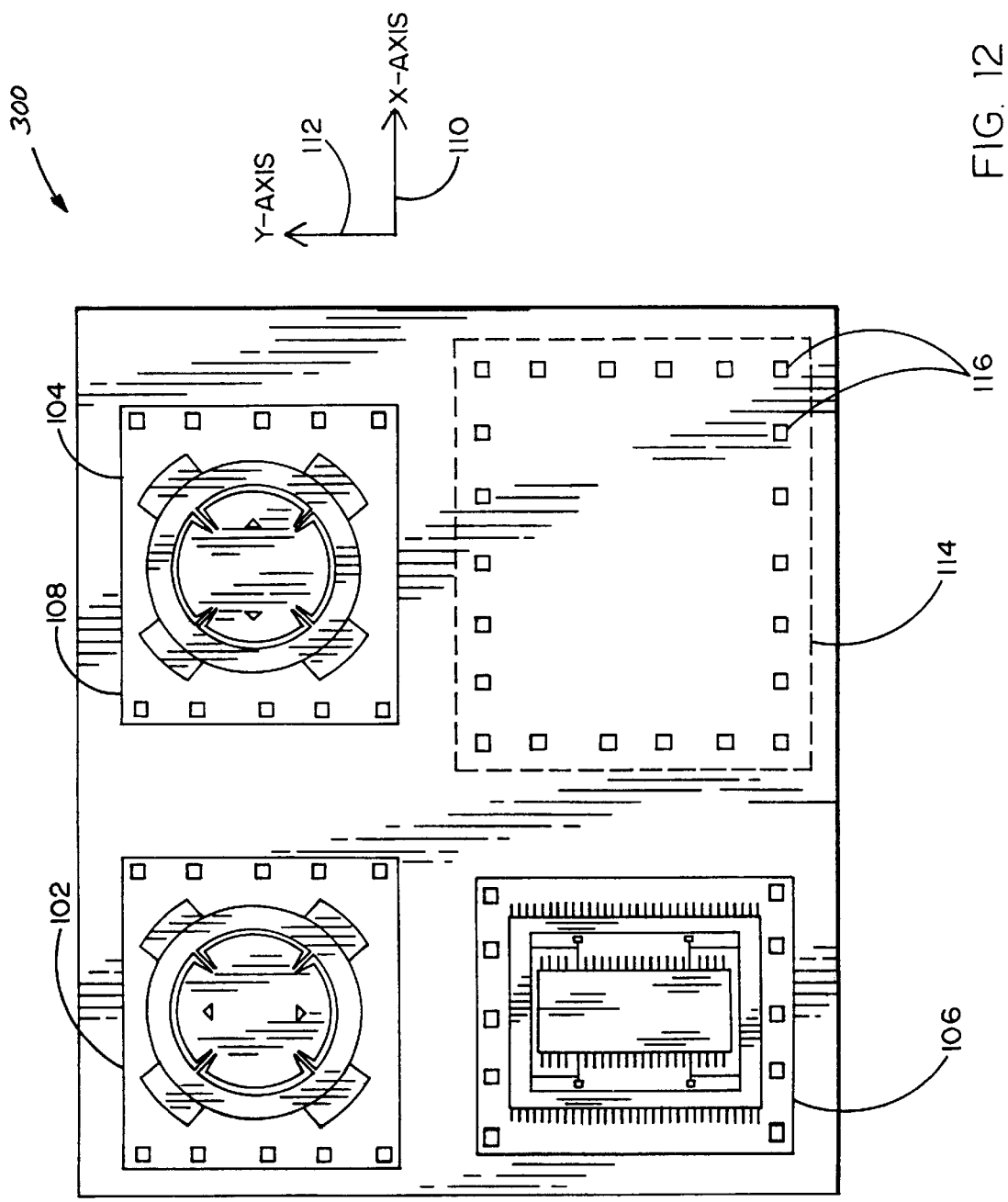
FIG. 12 is a plan view of a three-axis micro-gyro structure according to a first preferred "single chip" embodiment wherein three micro-gyros and suitable drive circuitry are formed on a single substrate.

FIG. 12 shows a micro-gyro combination that provides a multi-axis micro-gyro structure 300 having universal responsiveness to rate axis motions, i.e., capable of sensing the angular motion of the gyro package in any one of its three orthogonal axes, X, Y, and Z.

Figure 13:
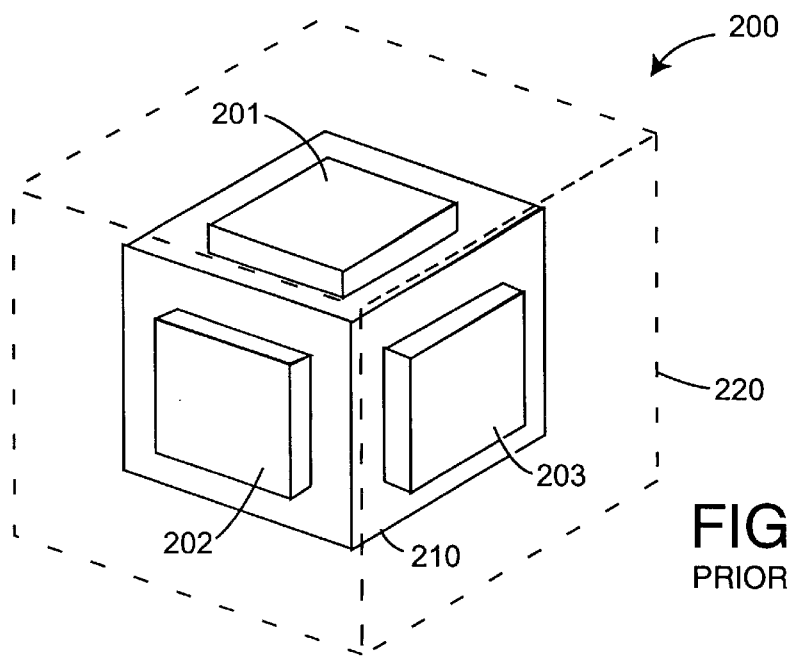
FIG. 13 is a schematic perspective view of a prior art approach to providing a three-axis micro-gyro structure.

FIG. 13, on the other hand, is a schematic perspective view of a prior art approach to providing a three-axis micro-gyro structure 200. The prior art structure 200 is inherently large and complex in terms of packaging. In particular, three single-axis micro-gyros 201, 202, 203 are mounted on three perpendicular faces of a cube 210 and the entire assembly is contained inside of an even larger housing 220. Electrical interconnection is also complex in that power and signaling must be routed in a three-dimensional manner.

The FIG. 12 structure 300 offers several advantages that stem from its planar and integrated construction. In particular, it can be produced at lower cost while providing higher reliability and taking up less space.

In the FIG. 12 embodiment, three micro-gyros 102, 104 and 106 are combined in a single planar structure 300, all of the micro-gyros 102, 104 and 106 being mounted on the same substrate 108, and all formed simultaneously with the process steps of material deposition, photolithography, and etching. The practical benefits are significant. An efficient manufacturing process, which is both more precise and less costly than other processes, provides, in a single plane, a compact micro-gyro structure 300 capable of sensing motion in any of the three orthogonal axes.

This design combines three micro-gyros on a single silicon chip to result in structure 300 having full three-axis sensing capability. This is accomplished by using the following arrangement: on a silicon substrate 108 are formed: a first micro-gyro 102 having its sensing axis lying on the plane of the chip, oriented such that its sensing axis is aligned with the X-axis 110; a second micro-gyro 104 rotated 90 degrees with respect to the first micro-gyro 102, with its sensing axis lying on the plane of the chip, aligned with the Y-axis 112; and a third micro-gyro 106 whose sensing axis (Z-axis) is perpendicular to the plane of the chip. Only two types of gyros are used. The X-axis and Y-axis gyros are substantially identical, and differ only in orientation and operating frequency. In particular, it is preferable to operate the micro-gyros at different frequencies (say 6 KHz and 7 KHz) in order to minimize cross-over and feedback.

The electronics for the gyros can also be integrated onto the same substrate 108. Drive electronics 114 are shown in the form of integrated circuits. The substrate 108 thus serves as a support for the gyros 102, 104, and 106, and also as a routing board providing electrical interconnections between the gyros, the electronics 114, and the bond pads 116. The method of integration of silicon sensors and integrated circuits is a well-established process for those skilled in the art of micromachines.

Other methods of integration are also possible. The substrate 108 can be a standard multi-layer circuit board, and the gyros and the integrated circuit can be components that are attached to this board. Methods of attachment include adhesive mounting combined with wire bonding, or flip-chip bonding (where the devices are bonded up-side down). The circuit board material can be either polymeric, ceramic, or silicon.

Other embodiments of a multi-axis micro-gyro structure are possible as suggested by the following description taken together with the figures.

Figure 14:
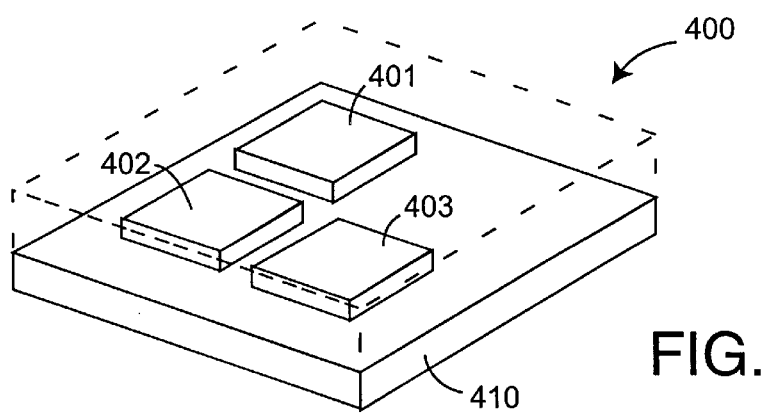
FIG. 14 is a schematic perspective view of a three-axis micro-gyro structure according to a second alternative embodiment wherein three pre-packaged micro-gyro devices are mounted on a printed circuit board or package base.

FIG. 14 shows an alternative embodiment of a multi-axis micro-gyro structure 400 that can be regarded as a flat board assembly. Here, three pre-packaged micro-gyro devices 401, 402, 403 are mounted on a support structure 410, such as, for example, a package base, a printed circuit board, or even an integrated circuit. In this embodiment, the first and second micro-gyro devices 401, 402 are substantially identical, preferably substantially as shown in the integral substrate embodiment of FIG. 12. As such, the micro-gyros 401, 402 are oriented orthogonally relative to one another and will measure the angular speed of the micro-gyro structure 400 around first and second rate axes extending in a plane of the micro-gyro structure. The third micro-gyro device 403 is of different construction, preferably a Z-axis gyro comparable in construction and operation to the micro-gyro 106 shown in the integral substrate embodiment of FIG. 12. The control electronics (not shown), can be provided off-package or mounted in the same general area used for that purpose in the FIG. 12 embodiment. The multi-axis micro-gyro structure 400 of FIG. 14 is not as compact as the integrated substrate embodiment of FIG. 12, but is significantly advantageous relative to the prior structure of FIG. 13.

Figure 15:
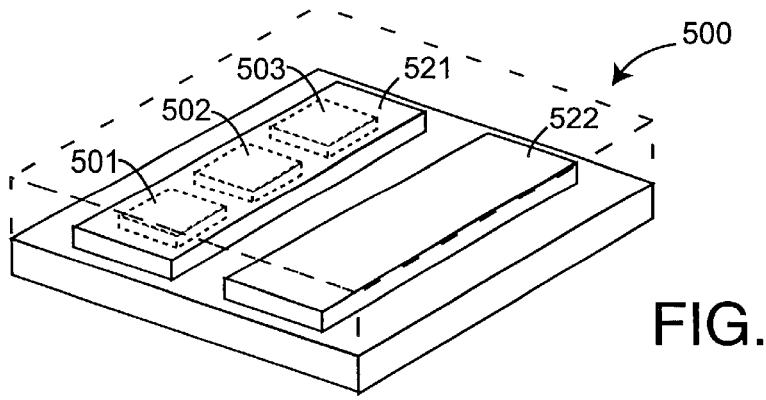
FIG. 15 is a schematic perspective view of a three-axis micro-gyro structure according to a third alternative embodiment that is a "two-chip" embodiment wherein one chip contains three micro-gyro devices that were formed through simultaneous manufacture on a single substrate and the other chip is an ASIC containing suitable drive and sense circuitry.

FIG. 15 is a schematic perspective view of a multi-axis micro-gyro structure 500 according to a third alternative embodiment. This multi-axis micro-gyro structure 500 shown here is a "two-chip" embodiment wherein one chip 521 contains three micro-gyro devices 501, 502, 503 that were preferably formed through simultaneous manufacture on a single substrate (not numbered) and the other chip 522 is an ASIC containing suitable drive and sense circuitry.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A unitary three-axis micro-gyro structure that comprises:

a monolithic substrate that defines a plane of the micro-gyro, and three micro-gyro devices formed simultaneously as a layer on the substrate by successive steps of depositing material, delineating desired material shapes by lithography, and etching to remove unwanted material, the first micro-gyro device being so constructed as to measure angular velocity of the micro-gyro structure around a first rate axis extending in the plane of the micro-gyro, the second micro-gyro device being so constructed as to measure angular velocity of the micro gyro structure around a second rate axis extending in the plane of the micro-gyro and perpendicular to the first rate axis; and the third micro-gyro device being so constructed as to measure angular velocity of the micro-gyro structure around a third rate axis perpendicular to the plane of the micro-gyro.

2. The unitary three-axis micro-gyro structure of claim 1 in which each micro-gyro device comprises:

a first momentum creating element formed as an outer element having an open center, and a second Coriolis sensing element formed as an inner element located in said center.

3. A three-axis micro-gyro structure of planar construction comprising:

first and second micro-gyro devices that measure angular velocity around first and second rate axes extending in the plane of the micro-gyro structure; and a third micro-gyro device that measures angular velocity around a third rate axis perpendicular to the plane of the micro-gyro structure.

4. The three-axis micro-gyro structure of claim 3 wherein the first and second micro-gyro devices are of substantially identical construction and the third micro-gyro device is of substantially different construction.

5. The three-axis micro-gyro structure of claim 3 wherein the first and second micro-gyro devices are oriented orthogonally relative to one another in the plane of the micro-gyro structure.

6. The three-axis micro-gyro structure of claim 3 wherein the first, second and third micro-gyro devices are substantially planar and wherein the first, second and third micro-gyro devices are arranged in a planar field such that the three-axis micro-gyro structure has a substantially planar configuration.

7. The three-axis micro-gyro structure of claim 3 further comprising a planar substrate that supports the first, second and third micro-gyro devices.

8. The three-axis micro-gyro structure of claim 7 wherein the three micro-gyro devices are formed simultaneously as a layer on the substrate by successive steps of depositing material, delineating desired material shapes by lithography, and etching to remove unwanted material.

9. The three-axis micro-gyro structure of claim 8 wherein the substrate is a silicon substrate.

10. The three-axis micro-gyro structure of claim 8 wherein the substrate is a quartz substrate.

11. The three-axis micro-gyro structure of claim 8 wherein the substrate is an alumina substrate.

12. The three-axis micro-gyro of claim 7 wherein the first, second and third micro-gyro devices are individually-formed devices that are individually mounted on the planar substrate.

13. The three-axis micro-gyro of claim 12 wherein the planar substrate comprises a printed circuit board (PCB).

14. The three-axis micro-gyro structure of claim 7 wherein the planar substrate is an integrated circuit.

15. The three-axis micro-gyro structure of claim 7 wherein the planar substrate is a package base.

16. The three-axis micro-gyro of claim 15 wherein the first, second and third micro-gyro devices are mounted on the package base.

17. The three-axis micro-gyro of claim 16 wherein the first, second and third micro-gyro devices are individually-formed devices that are individually mounted on the package base.

18. The three-axis micro-gyro of claim 16 wherein the first and second micro-gyro devices are formed on a common intermediate substrate.

19. The three-axis micro-gyro of claim 18 wherein the first and second micro-gyro devices are simultaneously formed on the common intermediate substrate by successive steps of depositing material, delineating desired material shapes by lithography, and etching to remove unwanted material.

20. The three-axis micro-gyro of claim 18 wherein the common intermediate substrate is a silicon substrate.

21. The three-axis micro-gyro structure of claim 18 wherein the common intermediate substrate is a quartz substrate.

22. The three-axis micro-gyro structure of claim 18 wherein the common intermediate substrate is an alumina substrate.

23. The three-axis micro-gyro of claim 16 wherein the first, second and third micro-gyro devices are formed on a common intermediate substrate.

24. The three-axis micro-gyro of claim 23 wherein the first, second and third micro-gyro devices are simultaneously formed on the common intermediate substrate by successive steps of depositing material, delineating desired material shapes by lithography, and etching to remove unwanted material.

25. The three-axis micro-gyro of claim 23 wherein the common intermediate substrate is a silicon substrate.

26. The three-axis micro-gyro structure of claim 23 wherein the common intermediate substrate is a quartz substrate.

27. The three-axis micro-gyro structure of claim 23 wherein the common intermediate substrate is an alumina substrate.

28. A three-axis micro-gyro structure of planar construction comprising:
   first and second micro-gyro devices that are substantially identical in construction,
      the first and second micro-gyro devices being constructed as to measure angular velocity of the micro-gyro structure around first and second rate axes extending in the plane of the micro-gyro structure,
      the first and second micro-gyro devices being oriented relative to one another in a plane of the micro-gyro structure to position the second rate axis perpendicular to the first rate axis; and
   a third micro-gyro device being constructed as to measure angular velocity of the micro-gyro structure around a third rate axis perpendicular to the plane of the micro-gyro structure.

29. The three-axis micro-gyro structure of claim 28 further comprising a monolithic substrate that supports the first, second and third micro-gyro devices in the plane of the micro-gyro structure.

30. The three-axis micro-gyro of claim 29 wherein the first and second micro-gyro devices are simultaneously formed on the monolithic substrate by successive steps of depositing material, delineating desired material shapes by lithography, and etching to remove unwanted material.

31. The three-axis micro-gyro of claim 30 wherein the monolithic substrate is a silicon substrate.

32. The three-axis micro-gyro structure of claim 30 wherein the monolithic substrate is a quartz substrate.

33. The three-axis micro-gyro structure of claim 30 wherein the monolithic substrate is an alumina substrate.

34. The three-axis micro-gyro of claim 29 wherein the first, second and third micro-gyro devices are simultaneously formed on the monolithic substrate by successive steps of depositing material, delineating desired material shapes by lithography, and etching to remove unwanted material.

35. The three-axis micro-gyro of claim 34 wherein the monolithic substrate is a silicon substrate.

36. A three-axis micro-gyro structure comprising:
   a planar substrate;
   a first micro-gyro device supported by the planar substrate and constructed as to measure angular velocity around a first rate axis extending in the plane of the substrate,
   a second micro-gyro device supported by the planar substrate and constructed as to measure angular velocity around a second rate axis extending in the plane of the substrate and perpendicular to the first rate axis; and
   a third micro-gyro device supported by the planar substrate and constructed as to measure angular velocity of the micro-gyro structure around a third rate axis perpendicular to the plane of the substrate.

37. The three-axis micro-gyro structure of claim 36 wherein the planar substrate is a silicon substrate, and wherein the three micro-gyro devices are formed simultaneously as a layer on the silicon substrate by successive steps of depositing material, delineating desired material shapes by lithography, and etching to remove unwanted material.

38. The three-axis micro-gyro structure of claim 36 wherein the planar substrate is an integrated circuit.

39. The three-axis micro-gyro of claim 36 wherein the first, second and third micro-gyro devices are individually-formed devices that are individually mounted on the planar substrate.

40. The three-axis micro-gyro of claim 39 wherein the planar substrate comprises a printed circuit board (PCB).

41. The three-axis micro-gyro structure of claim 36 wherein the planar substrate is a package base.

42. The three-axis micro-gyro of claim 41 wherein the first, second and third micro-gyro devices are mounted on the package base.

43. The three-axis micro-gyro of claim 42 wherein the first, second and third micro-gyro devices are individually-formed devices that are individually mounted on the package base.

44. The three-axis micro-gyro of claim 42 wherein the first and second micro-gyro devices are formed on a common intermediate substrate.

45. The three-axis micro-gyro of claim 44 wherein the first and second micro-gyro devices are simultaneously formed on the common intermediate substrate by successive steps of depositing material, delineating desired material shapes by lithography, and etching to remove unwanted material.

46. The three-axis micro-gyro of claim 44 wherein the common intermediate substrate is a silicon substrate.

47. The three-axis micro-gyro of claim 42 wherein the first, second and third micro-gyro devices are formed on a common intermediate substrate.

48. The three-axis micro-gyro of claim 47 wherein the first, second and third micro-gyro devices are simultaneously formed on the common intermediate substrate by successive steps of depositing material, delineating desired material shapes by lithography, and etching to remove unwanted material.

49. The three-axis micro-gyro of claim 47 wherein the common intermediate substrate is a silicon substrate.

50. A method of measuring angular velocity about three orthogonal axes comprising the steps of:
   providing first, second and third micro-gyros on a planar substrate;
   orienting the first micro-gyro to measure angular velocity about a first axis parallel to the substrate;
   orienting the second micro-gyro to measure angular velocity about a second axis perpendicular to the first axis and parallel to the substrate; and
   orienting the third micro-gyro to measure angular velocity about a third axis perpendicular to the substrate.

51. The method of claim 50 wherein the providing steps comprises the substep of simultaneously forming the first, second and third micro-gyros onto the planar substrate.

52. The method of claim 50 wherein the providing steps comprises the substeps of pre-forming the first, second and third micro-gyros, packaging the pre-formed micro-gyros, and then mounting the packaged, pre-formed micro-gyros onto the planar substrate.

\* \* \* \* \*

UNITED STATES PATENT AND TRADEMARK OFFICE
CERTIFICATE OF CORRECTION

| | | |
|---|---|---|
| PATENT NO. | : 6,578,420 B1 | Page 1 of 1 |
| APPLICATION NO. | : 09/604782 | |
| DATED | : June 17, 2003 | |
| INVENTOR(S) | : Ying Wen Hsu | |

It is certified that error appears in the above-identified patent and that said Letters Patent is hereby corrected as shown below:

ON THE TITLE PAGE: The following priority information is added:

(60)    Provisional application No. 60/036,759, filed on January 28, 1997.

IN THE SPECIFICATION:

Column 1, Line 12: "filed on Jun. 6, 1997 and now abandoned.", should read --filed on Jun. 6, 1997 and now abandoned, which claims the benefit of priority under 35 U.S.C §119 from U.S. Provisional Patent application Ser. No. 60/036,759, filed on Jan. 28, 1997--.

Signed and Sealed this

Ninth Day of February, 2010

David J. Kappos
*Director of the United States Patent and Trademark Office*